United States Patent
Borkovic

(10) Patent No.: US 12,159,217 B1
(45) Date of Patent: Dec. 3, 2024

(54) USING VECTOR CLOCKS TO SIMPLIFY A DEPENDENCY GRAPH IN A NEURAL NETWORK ACCELERATOR

(71) Applicant: Amazon Technologies, Inc., Seattle, WA (US)

(72) Inventor: Drazen Borkovic, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1056 days.

(21) Appl. No.: 16/829,331

(22) Filed: Mar. 25, 2020

(51) Int. Cl.
*G06N 3/063* (2023.01)
*G06N 3/049* (2023.01)

(52) U.S. Cl.
CPC .............. *G06N 3/063* (2013.01); *G06N 3/049* (2013.01)

(58) Field of Classification Search
CPC .............................. G06N 3/063; G06N 3/049
See application file for complete search history.

(56) References Cited

U.S. PATENT DOCUMENTS

| | | | | |
|---|---|---|---|---|
| 2008/0288834 | A1* | 11/2008 | Manovit | G06F 11/3612 703/21 |
| 2009/0248689 | A1* | 10/2009 | Petersen | G06F 16/2308 |
| 2018/0276035 | A1* | 9/2018 | Henry | G06F 9/4812 |

OTHER PUBLICATIONS

Reagen et al. ("Minerva: Enabling low-power, highly-accurate deep neural network accelerators." ACM SIGARCH Computer Architecture News 44.3 (2016): 267-278 (Year: 2016).*

Gupta et al. ("Model accuracy and runtime tradeoff in distributed deep learning: A systematic study." 2016 IEEE 16th International Conference on Data Mining (ICDM). IEEE, 2016.) (Year: 2016).*
U.S. Appl. No. 16/585,575, "Event Assignment for Synchronization of Concurrent Execution Engines," filed Sep. 27, 2019, 56 pages.
Aho et al., "The Transitive Reduction of a Directed Graph," SIAM Journal on Computing, vol. 1, No. 2, Jun. 1972, pp. 131-137.
Fidge, "Timestamps in Message-Passing Systems that Preserve the Partial Ordering," Australian Computer Science Communications, vol. 10, No. 1, Feb. 1988, pp. 56-66.
Lamport, "Time, Clocks, and the Ordering of Events in a Distributed System," Communications of the ACM, vol. 21, No. 7, Jul. 1978, pp. 558-565.
Mattern, "Virtual Time and Global States of Distributed Systems," Department of Computer Science, University of Kaiserslautern, Parallel and Distributed Algorithms, Elsevier Science Publishers B.V., 1989, pp. 120-131.

* cited by examiner

*Primary Examiner* — Li B. Zhen
*Assistant Examiner* — Moriam Mosunmola Godo
(74) *Attorney, Agent, or Firm* — Kilpatrick Townsend & Stockton LLP

(57) ABSTRACT

Methods for simplifying a dependency graph in a neural network accelerator are provided. Computations and data movements for the neural network accelerator may be described with a flow graph, where graph nodes represent computation or data movement operations and graph edges represent dependencies between operations. A flow graph may contain redundant edges that can be removed while retaining the reachability of each of the nodes in the graph. To identify redundant edges, a compiler may generate vector clocks to track the relationships of operations performed by various execution engines prior to execution of a program reaching a given node or operation. Redundant edges may be identified and removed based on the relative values of the vector clocks to reduce the complexity of the graph.

20 Claims, 11 Drawing Sheets

USING VECTOR CLOCKS TO SIMPLIFY A DEPENDENCY GRAPH IN A NEURAL NETWORK ACCELERATOR

BACKGROUND

Integrated circuit devices, such as processors, accelerators, and others, can include multiple computation and data-movement engines. For example, the integrated circuit device can include parallel computation engines that are capable of performing large, multi-stage computations, such as convolutions. As another example, the integrated circuit device can include computation engines for more specific operations, such as accumulating values or performing floating point math.

The computations and data movements may be described with a flow graph, where graph nodes represent computation or data movement operations (e.g., activation, matrix multiplication, pooling, etc.) and graph edges represent dependencies between operations. The engines may need to synchronize periodically because (i) one engine consumes data produced by another engine, or (ii) one engine needs to use a resource such as memory space currently reserved for another engine.

BRIEF DESCRIPTION OF THE DRAWINGS

Various embodiments in accordance with the present disclosure will be described with reference to the drawings, in which.

DETAILED DESCRIPTION

The operations of an integrated circuit device such as a processor can be directed by instructions, which can be generated for the integrated circuit device by a compiler. A compiler is a software program that transforms programs written in human-readable programming language into machine language that can be understood by the integrated circuit device. The output of a compiler can be referred to as program code, program instructions, or machine instructions, among other examples.

When an integrated circuit device includes multiple execution engines, in various examples, the compiler for the device can produce sets of instructions for each execution engine. The instructions for an execution engine can includes steps such as reading data from memory of the device, performing a computation on the data, and writing a result of the computation back to the memory of the device. In some examples, the execution engines can independently execute respective sets of instructions, so that the execution engines can operate in parallel.

In some examples, however, the operation of one execution engine may be dependent on the operation of another execution engine. For example, a result computed by one execution engine may be needed as the input of an operation to be performed by a second execution engine. Limitations of the integrated circuit device can also cause dependencies between the execution engines. For example, the device may have a limited amount of memory or a limited number of registers in which inputs for and results from the execution engines can be stored. In this example, one execution engine may need to store a result in a memory location in which the inputs for another execution engine are stored.

When the operations of the execution engines of an integrated circuit device can have dependencies such as those described above, the compiler for the device can capture the dependencies, for example, in a dependency or dataflow graph. In a dependency graph, nodes in the graph can represent operations or sets of operations to be performed by individual execution engines. The edges or connections between the nodes can represent dependencies between the operations at the nodes.

Figure 1:
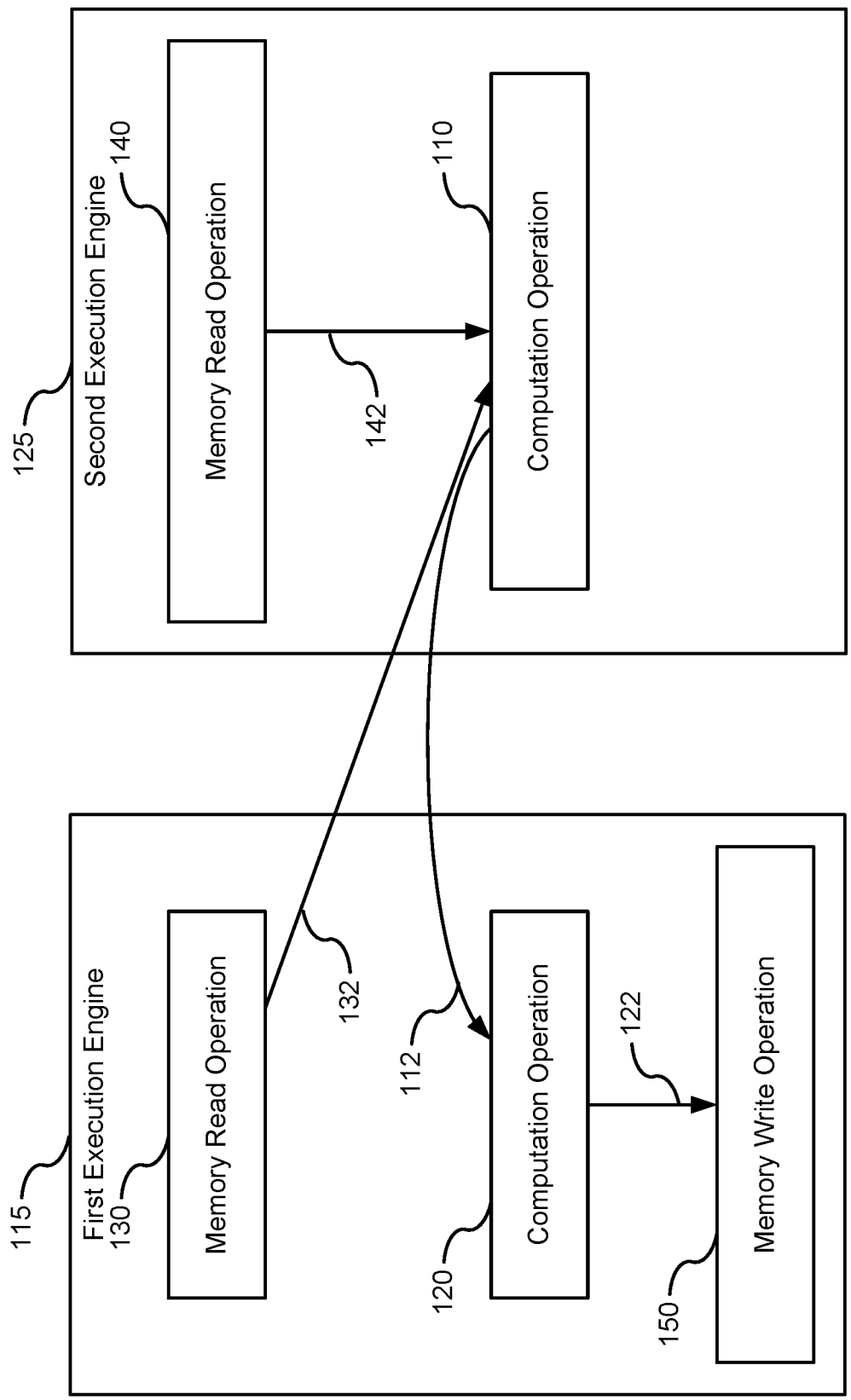
FIG. 1 is a diagram illustrating an example of operations in a dependency graph as these operations may be executed by a first execution engine and a second execution engine according to some aspects of the present disclosure.

FIG. 1 is a diagram illustrating an example of operations in a dependency graph as these operations may be executed by a first execution engine 115 and a second execution engine 125 according to some aspects of the present disclosure. The first execution engine 115 can be, for example, a computational array of an integrated circuit device, and the second execution engine 125 can be a pooling engine, among other examples. With respect to a dependency graph, a node may refer to operation(s) to be performed by an execution engine, the terms "operations" and "nodes" may be used interchangeably herein.

In the example of FIG. 1, the operations of node 130, which includes a memory read operation, are performed by the first execution engine 115 and the operations of node 140, which also include a memory read operation, are performed by the second execution engine 125. The second execution engine 125 then performs the operations of node 110, which include a computation operation on the outputs of node 130 and node 140. As illustrated by this example, the computation of node 110 uses the output of the memory read operation of node 130, and thus needs the operation of node 130 to complete before the computation can be performed.

Edge 132 thus illustrates a data or resource dependency between the first execution engine 115 and the second execution engine 125. In contrast, the computation of node 110 also needs the memory read operation of node 140 to be completed, but because the operations of node 140 and node 110 are performed by the same execution engine, the edge 142 does not represent a data or resource dependency because the second execution engine 125 need not wait on another execution engine in order to proceed to the operations of node 110.

Similarly, edge 112 illustrates a dependency between the first execution engine 115 and the second execution engine 125. For example, the computation operation of node 120 may require the result of the computation operation of node 110. Edge 122 further illustrates a non-dependency, since the operations of node 150 can follow the operations of node 120 without needing to wait for the operations of another execution engine to complete.

When the operations of the execution engines of an integrated circuit device can have dependencies such as those described above, the compiler for the device can capture the dependencies, for example, in a dependency graph. In a dependency graph, nodes in the graph can represent operations or sets of operations to be performed by individual execution engines. The edges or connections between the nodes can represent dependencies between the operations at the nodes. Each dependency edge can be implemented with synchronization instructions such as SET_EVENT, WAIT_ON_EVENT_AND_CLEAR, INCR_SEMAPHORE, DECR_SEMAPHORE, and WAIT_ON_SEMAPHORE. However, the dependency graph may have more edges than necessary for proper functioning. For example if there is an edge 'e' between nodes n1 and n2 and there is also another path between nodes n1 and n2 that does not include the edge 'e', then the edge 'e' is redundant and can be removed from the graph without affecting correctness of the execution. A path between two nodes n1 and n2 can be a sequence of edges between nodes n1 and n2 that includes edges between intervening nodes.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

In various implementations, provided are systems, methods, and other techniques for generating instructions for an integrated circuit device, for example, a neural network accelerator. The integrated circuit device includes multiple execution engines, which may be able to operate independently but whose operations may have data and/or resource dependencies. In various examples, the techniques discussed herein can include receiving an input data set that describes the operations to be performed by the integrated circuit device. The input data can, for example, be a dependency graph. From the input data set, a memory operation to be performed by a first execution engine can be identified, as well as an operation that is to be performed by a second execution engine and that requires that the memory operation be completed.

Figure 2:
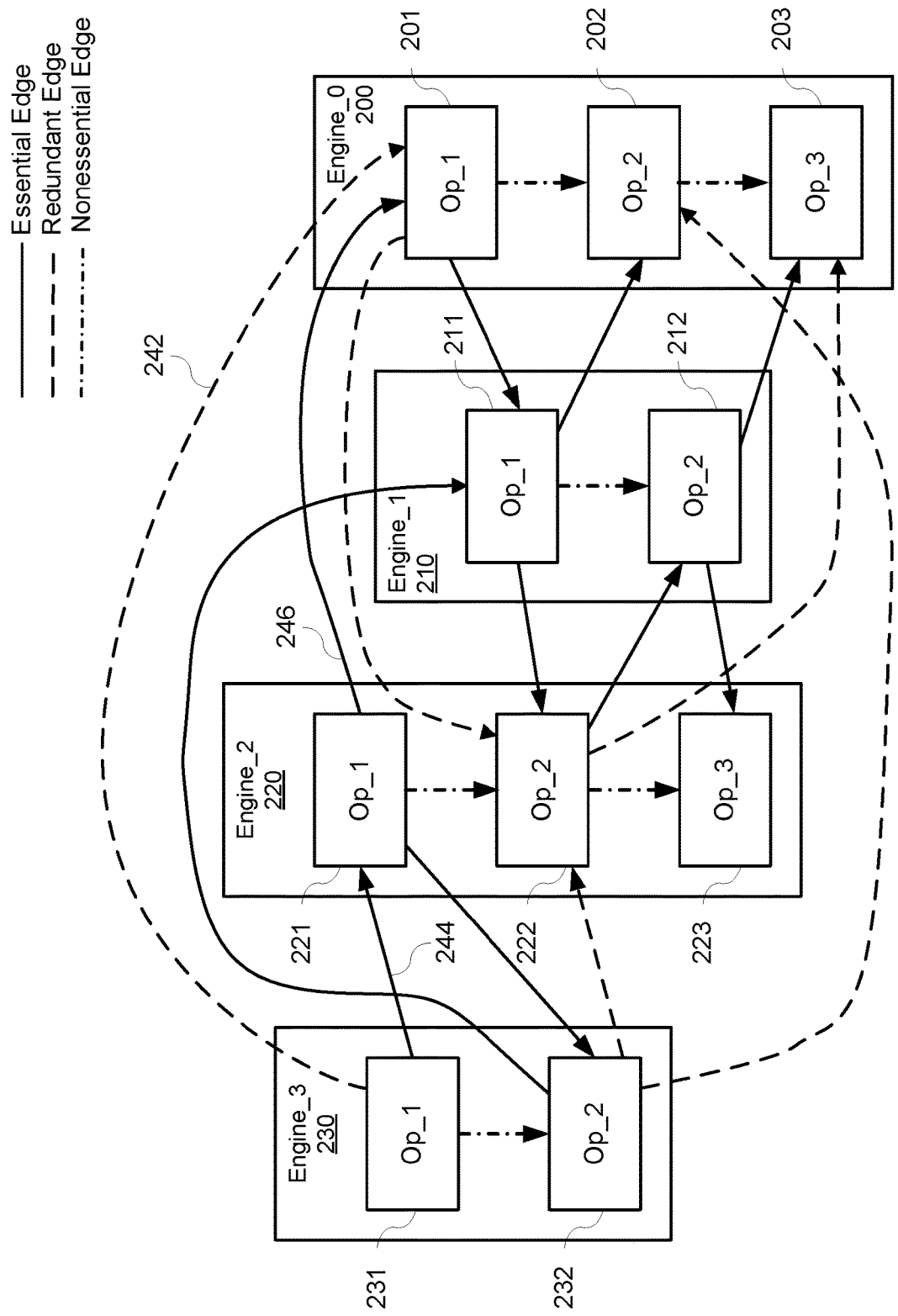
FIG. 2 is a diagram illustrating an example of a dependency graph having redundant edges according to some aspects of the present disclosure.

FIG. 2 is a diagram illustrating an example of a dependency graph having redundant edges according to some aspects of the present disclosure. The dependency graph may be generated by a compiler for a neural network. Each node in the dependency graph may represent an operation or a set of operations performed by execution engines, and the edges may represent dependencies between the operations. In FIG. 2, the nodes in the dependency graph are grouped to illustrate the execution engines that perform the operations of the nodes.

Referring to FIG. 2, the execution engines (200-203) represent computation engines, for example, activation engines, pooling engines, processing elements of a processing element array, etc., and data transfer engines, for example Direct Memory Access (DMA) engines. The nodes (e.g., 201-203, 211-212, 221-223, 231-232) represent operations that may be performed by the execution engines. The edges connecting the nodes represent dependencies. Computational operations (e.g., MatMul, Pool, Mult, Add) may be executed on computation engines (e.g., PE engine, Pooling engine), and data transfer operations (e.g., Load, Save) may be executed by DMA engines on several DMA queues. One DMA engine can execute transfers on several DMA queues and those transfers could be executed so that the transfers in two DMA queues appear concurrent (e.g., similar to executing multiple processes on one CPU using time slicing). However, the transfers in one DMA queue can be made sequential by using DMA barrier (DMB) flags on some DMA descriptors and the transfers can be synchronized using additional DMA descriptors. The synchronization DMA descriptors can set events or change (increment or decrement) semaphore values.

The edges between operations on the same execution engine (e.g., one computational engine or one DMA queue) do not require synchronization and can be referred to as nonessential edges. The edges between operations on different execution engines may need synchronization and can be referred to as essential edges. In FIG. 2, there are 21 edges; 15 of those edges are essential edges, e.g., they are edges between operations performed on different execution engines, indicated by the solid arrows and dashed arrows. Six of the edges, indicated by the dash-dot arrows, are nonessential edges.

In an arbitrary dependency graph, certain essential edges between nodes of two execution engines may not require synchronization. An essential edge may not require synchronization when a sequence of other operations and edges, also referred to as a path, exists from the node at the beginning of the edge to the node at the end of the edge. An essential edge between two nodes may be determined to be a redundant edge when another path between the two nodes exists. For example, referring again to FIG. 2, the essential edge 242 between node Op_1 231 of execution engine 230 and node Op_1 201 of execution engine 200 may be a redundant edge due to the path between node Op_1 231 and node Op_1 201 formed by the edge 244 between node Op_1 231 of execution engine 230 and node Op_1 221 of execution engine 220, and the edge 246 between node Op_1 221 of execution engine 220 and node Op_1 201 of execution engine 200.

Redundant edges, illustrated by dashed arrows in FIG. 2, may be removed from the dependency graph. Removal of a redundant edge does not affect redundancy status of any remaining edge. Redundant edges may be identified in any order and may be removed in any order.

Figure 3:
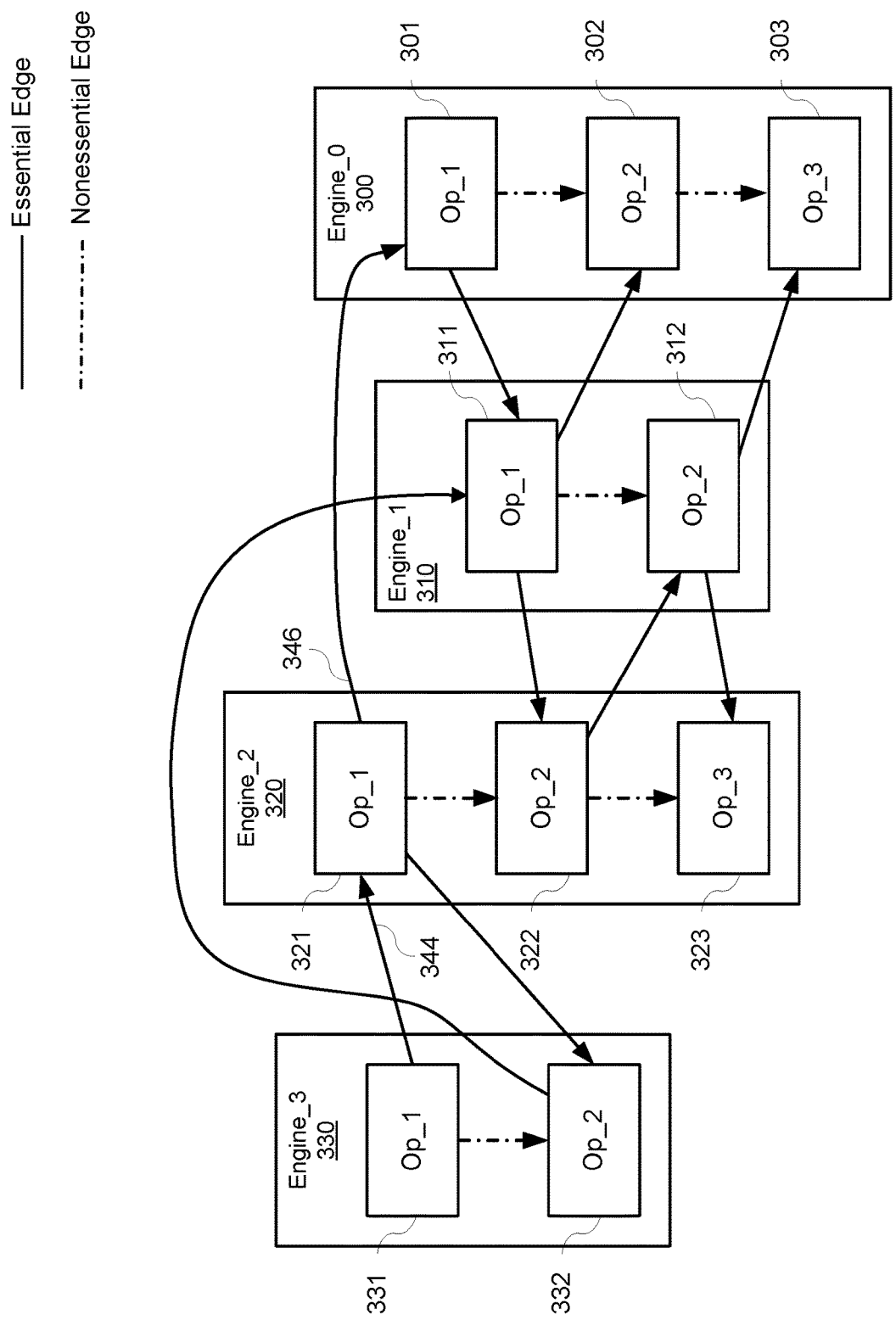
FIG. 3 is a diagram illustrating the dependency graph of FIG. 2 with redundant edges removed according to some aspects of the present disclosure.

FIG. 3 is a diagram illustrating the dependency graph of FIG. 2 with redundant edges removed according to some aspects of the present disclosure. As shown in in FIG. 3, the redundant essential edge formerly directed between node Op_1 331 of execution engine 330 and node Op_1 301 of execution engine 300 has been removed, and the path formed by the edge 344 between node Op_1 331 of execution engine 330 and node Op_1 321 of execution engine 320, and the edge 346 between node Op_1 321 of execution engine 320 and node Op_1 301 of execution engine 300 provides the reachability of node Op_1 301 of execution engine 300 from node Op_1 331 of execution engine 330. Similarly, the other redundant essential edges have been removed while retaining the reachability of each of the nodes as in the dependency graph of FIG. 2.

Aspects of the present disclosure can reduce the complexity of any dependency graph that describes concurrent computation of several sequential execution engines using a transitive reduction algorithm or another reduction algorithm. A transitive reduction of a directed graph, for example a dependency graph, is another directed graph with the same nodes and a minimum number of edges, such that if there is a (directed) path from node v to node w, then there is also such a path in the reduction. The reduction is a directed graph that has the same ability to reach one node from another node as the original graph. The transitive reduction of a finite directed acyclic graph (e.g., a directed graph without directed cycles) is unique and is a subgraph of the given graph.

Figure 4A:
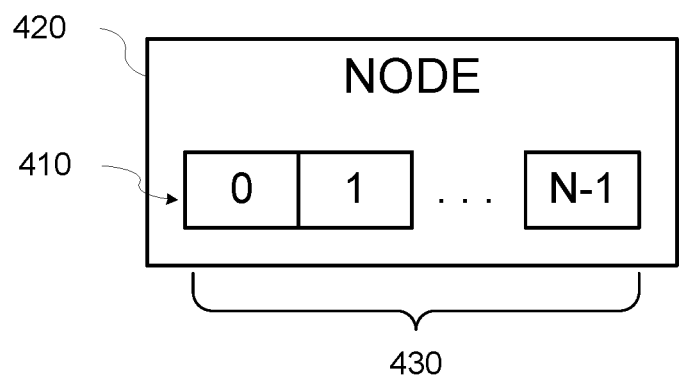
FIG. 4A is a diagram representing an example of vector clocks associated with a dependency graph node according to some aspects of the present disclosure.

According to some aspects of the present disclosure, vector clocks may be generated by a compiler to track the relationships of operations performed (or equivalently, nodes traversed) by various execution engines prior to execution of a program reaching a given node or operation. FIG. 4A is a diagram representing an example of a vector clock associated with a dependency graph node according to some aspects of the present disclosure. Referring to FIG. 4A, the compiler may generate a vector clock 410 for each node 420 in a dependency graph. The vector clock 410 may track and increment values of the vector clock elements for operations performed by each execution engine of an integrated circuit. For example, an integrated circuit (e.g., an accelerator) may have N execution engines. Accordingly, the vector clock 410 for each node 420 may have N elements 430 (designated, for example, as elements 0 to N−1), each element corresponding to operations performed by one of the N execution engines.

The value of each element of a vector clock may be incremented based on an operation performed or node traversed by the corresponding execution engine. As referred to herein, the terms "operation" and "node" may be used interchangeably to refer to a node of a dependency graph. The operation or node may include one operation or a series of operations. The values of the vector clock elements may be associated with the endpoints of the operations or nodes. Element values for a vector clock of a subsequent node may replicate the element values of the vector clocks of preceding nodes that have input edges to the subsequent node. A preceding node is a node that happens before a subsequent node and provides an essential edge input to the subsequent node.

Figure 4B:
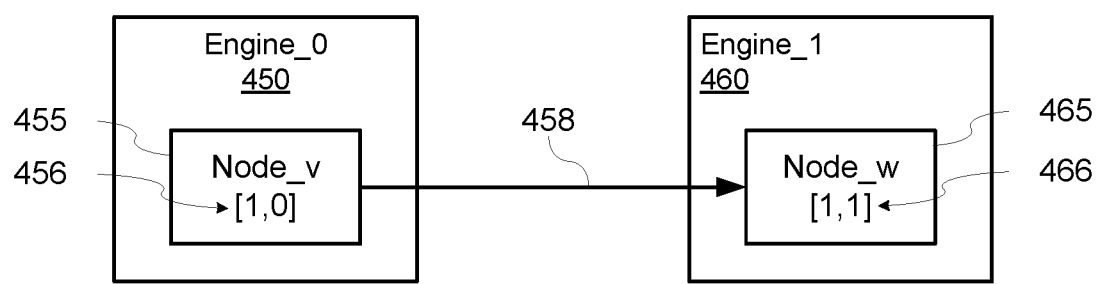
FIG. 4B is a diagram representing an example of incrementing element values of the vector clocks according to some aspects of the present disclosure.

FIG. 4B is a diagram illustrating an example of incrementing element values of the vector clocks according to some aspects of the present disclosure. FIG. 4B illustrates two execution engines, Engine_0 450 having a node node_v 455, and Engine_1 460 having a node node_w 465. Node_v 455 includes a representation of a vector clock 456, and node_w 465 includes a representation of a vector clock 466. Each vector clock 456, 466 includes two elements, with the leftmost element (element_0) corresponding to a node traversed (or operation performed) by Engine_0 450 and the rightmost element (element_1) corresponding to a node traversed (or operation performed) by Engine_1 460. The vector clocks 456, 466 illustrate the element values associated with the endpoints of the operations or nodes for Engine_0 450 and Engine_1 460.

As illustrated in FIG. 4B, the leftmost element (element_0) corresponding to Engine_0 450 is set to "1" in the vector clock 456 for node_v 455 since the element value is associated with an endpoint of the operation at node_v 455. The rightmost element (element_1) corresponding to Engine_1 460 is set to "0" since Engine_1 460 does not provide an input edge to node_v 455 of Engine_0 450. Thus, the element values for the vector clock 456 for node_v 455 are [1, 0].

Edge 458 is an output from node_v 455 and an input to node_w 465. Node_w 465 is therefore a subsequent node to node_v 455 and receives the input edge from node_v 455. Node_v 455 is a preceding node to node_w 465. Accordingly, the element value of element_0 (e.g., the leftmost element) corresponding to node_v 455 of Engine_0 450 for the vector clock 466 for node_v 465 replicates the element value of "1" from the vector clock for the preceding node_v 455. The element value for the rightmost element (element_1) corresponding to node_w 465 of Engine_1 460 is incremented since the element value is associated with an endpoint of the operation at node_w 465. Thus, the element values for the vector clock 466 for node_v 465 are [1, 1]. The element values for the vector clock of a subsequent node may replicate the maximum element values from all the preceding nodes.

For ease of explanation, the value of a vector clock (vvc) can be denoted with reference to the execution engine and the node within the execution engine. For example, referring to FIG. 4B, the value of the vector clock for Node_v may be denoted as vvc[Engine_0][Node_v]=[1, 0]. Likewise, the value of the vector clock for Node_w may be denoted as vvc[Engine_1][Node_w]=[1, 1].

Figure 5:
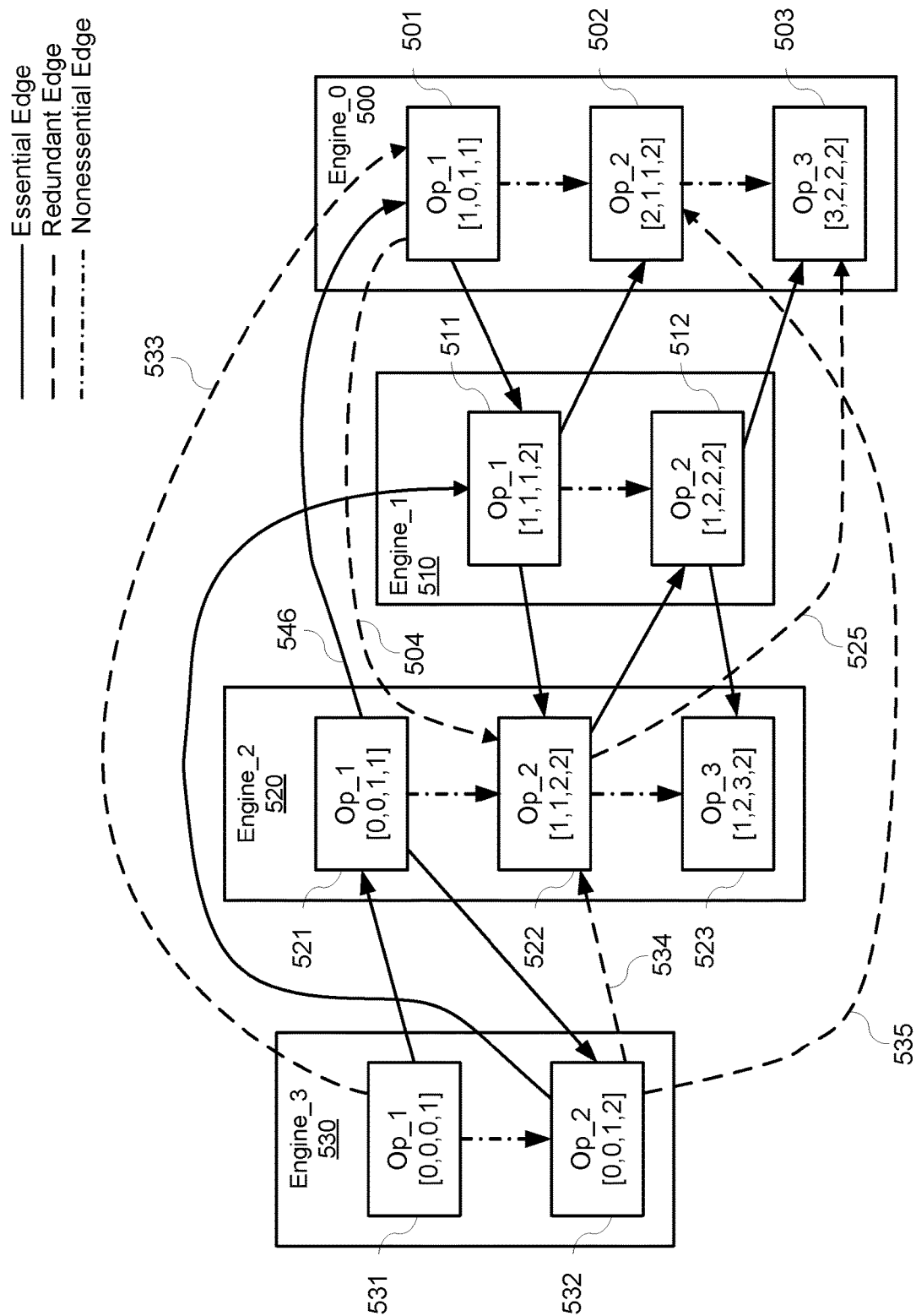
FIG. 5 is a diagram illustrating an example of a dependency graph having redundant edges and including vector clocks for operations according to some aspects of the present disclosure.

FIG. 5 is a diagram illustrating an example of a dependency graph having redundant edges and including vector clocks for operations according to some aspects of the present disclosure. FIG. 5 illustrates for execution engines: Engine_0 500, Engine_1 510, Engine_2 520, and Engine_3 530. The execution engines may be, for example, activation engines, pooling engines, processing elements, DMA engines, or any combination thereof. Each execution engine may perform operations represented by nodes. For example, execution engine Engine_0 500 may perform operations Op_1 501, Op_2 502, and Op_3 503, execution engine Engine_1 510 may perform operations Op_1 511 and Op_2 512, execution engine Engine_2 520 may perform operations Op_1 521, Op_2 522, and Op_3 523, and execution engine Engine_3 530 may perform operations Op_1 531 and Op_2 532.

Edges between nodes represent dependencies between operations. In cases where dependencies exist between operations performed by different execution engines, the execution engines may periodically be synchronized. Edges between various operations may be characterized as essential edges, redundant edges, and nonessential edges. An essential edge is an edge between operations on different execution engines. Essential edges between operations on different execution engines indicate dependencies. Thus, essential edges may need to be synchronized. Essential edges are indicated in FIG. 5 by solid arrows. A redundant edge may also be an essential edge, but may be redundant because another path exists to reach the node on which the redundant edge terminates. Redundant edges are illustrated in FIG. 5 by dashed arrows. A nonessential edge is an edge between operations performed on the same execution engine. Since the operations are performed in the same execution engine, the edges do not require synchronization. Therefore, the edges between these operations are nonessential. Nonessential edges are illustrated in FIG. 5 by dash-dot arrows.

In FIG. 5, a vector clock is illustrated in each node. The elements of the vector clock may be enumerated from left to right as element_0, element_1, element_2, and element_3, corresponding to Engine_0, Engine_1, Engine_2, and Engine_3, respectively. The element values of each vector clock may be integer values and may initially be set to 0. The vector clock may be generated by the compiler and may track values of the vector clock elements corresponding to preceding operations performed by each execution engine that provides an input edge to the node. Thus, the element values of the vector clocks may be incremented by 1 as each operator is executed by the execution engines. The vector clock may also increment the vector clock element corresponding to the operation performed by the node of the vector clock. For example, node Op_1 501 of Engine_0 500 receives input edges from node Op_1 521 of Engine_2 520 and from node Op_1 531 of Engine_3 530.

The value of the vector clock associated with node Op_1 501 of Engine_0 500 may be determined as follows. Element_0 of the vector clock associated with node Op_1 501 corresponds to node Op_1 501 of Engine_0 500. Since the element value is associated with the endpoint of the operation at node Op_1 501, the value of element_0 is incremented from 0 to 1. Node Op_1 501 of Engine_0 500 does not receive an input edge from Engine_1, so the value of element_1 remains 0. Node Op_1 501 of Engine_0 500 receives an input edge from node Op_1 521 of Engine_2 520. Since node Op_1 521 of Engine_2 520 has completed (e.g., element value is associated with the endpoint of the operation), the value of element_2 of the vector clock associated with node Op_1 501 of Engine_0 500 (as well as the value of element_2 of the vector clock associated with node Op_1 521 of Engine_2) will be 1.

Finally, node Op_1 501 of Engine_0 500 receives an input edge from node Op_1 531 of Engine_3 530. Since node Op_1 531 of Engine_3 530 has completed, the value of element 3 of the vector clock associated with node Op_1 501 of Engine_0 500 (as well as the value of element_3 of the vector clock associated with node Op_1 531 of Engine_3) will be 1. Thus, the value of the vector clock associated with node Op_1 501 of Engine_0 500 will be [1, 0, 1, 1], or vvc[Engine_0][Op_1]=[1, 0, 1, 1].

The dependency graph may be simplified by removing redundant edges. Redundant edges may be identified based on the vector clock values. Values of the vector clocks from preceding nodes from other execution engines having input edges to a subsequent node may be compared to determine whether one or more of the edges from the preceding nodes to the subsequent node are redundant. A preceding node is a node having an operation that is performed by another execution engine prior to the operations of the subsequent node being performed. The term "operation" can include the use of a resource by the preceding node for which the subsequent node must wait. An input edge to the subsequent node from a preceding node that has a vector clock value less than the vector clock value for another preceding node that provides an input edge to the subsequent node may be a redundant edge. Vector clock values from all preceding nodes from other execution engines that provide input edges to the subsequent node may be evaluated to determine whether the input edges are redundant.

Vector clock values may be compared on an element-by-element basis. A vector clock value for one node is less than or equal to a vector clock value for another node if each element of the one node is less than or equal to the corresponding element of the other node. A vector clock value for one node is less than a vector clock value for another node if each element of the one node is less than the corresponding element of the other node. For example, referring to FIG. 5, vvc[Engine_2][Op_2]=[1, 1, 2, 2] 522 is less than vvc[Engine_1][Op_2]=[1, 2, 2, 2] 512 since element_1 of vvc[Engine_2][Op_2] is less than element_1 of vvc[Engine_1][Op_2]], while the values of element_0, element_2, and element_3 of the vector clocks are equal.

In the example graph of FIG. 5, several nodes receive essential edge inputs from multiple preceding nodes. Vector clocks of the preceding nodes may be compared as explained below to determine redundant edges. The redundant edges may then be removed to simplify the dependency graph. According to aspects of the present disclosure, the compiler may compare and remove redundant edges.

Referring first to node Op_1 501 of Engine_0 500, it can be seen that the node receives an essential edge input from node Op_1 521 of Engine_2 520 and an essential edge input from node Op_1 531 of Engine_3 530. The vector clock values of preceding node Op_1 521 of Engine_2 520 and preceding node Op_1 531 of Engine_3 530 may be compared to determine whether either of the essential edge inputs to node Op_1 501 is redundant. For example, the compiler may compare the vector clock values of the nodes providing the essential edge inputs to node Op_1 501 of Engine_0 500.

As shown in FIG. 5, vvc[Engine_3][Op_1]=[0, 0, 0, 1] is less than vvc[Engine_2][Op_1]=[0, 0, 1, 1] since element_2 (i.e., 0) of the vector clock value for node Op_1 531 of Engine_3 530 is less than element_2 (i.e., 1) of the vector clock value for node Op_1 521 of Engine_2 520. The values of element_0, element_1, and element_3 of the vector clocks are equal. Therefore, the essential edge 533 between Op_1 531 of Engine_3 530 and Op_1 501 of Engine_0 500 is redundant, and the compiler may remove the essential edge 533 from the dependency graph.

Node Op_2 522 of Engine_2 520 receives essential edge inputs from node Op_1 501 of Engine_0 500, node Op_1 511 of Engine_1 510, and node Op_2 532 of Engine_3 530. Each of the vector clock values from the preceding nodes may be compared to determine whether any of the essential edge inputs to node Op_2 522 are redundant. For example, the compiler may compare the vector clock values of the nodes providing the essential edge inputs to node Op_2 522 of Engine_2 520. As shown in FIG. 5, vvc[Engine_3][Op_2] =[0, 0, 1, 2] is less than vvc[Engine_1][Op_1]=[1, 1, 1, 2] since element_0 and element_1 of the vector clock value for node Op_2 532 of Engine_3 530 are less than element_0 and element_1 of the vector clock value for node Op_1 511 for Engine_1 510. The values of element_2 and element_3 of the vector clocks are equal. Therefore, the essential edge 534 between Op_2 532 of Engine_3 530 and node Op_2 522 of Engine_2 520 is redundant, and the compiler may remove the redundant essential edge 534 from the dependency graph.

Similarly, vvc[Engine_0][Op_1]=[1, 0, 1, 1] is less than vvc[Engine_1][Op_1]=[1, 1, 1, 2] since element_1 and element_3 of the vector clock value for node Op_1 501 of Engine_0 500 are less than element_1 and element_3 of the vector clock value for node Op_1 511 for Engine_1 510. The values of element_0 and element_2 of the vector clocks are equal. Therefore, the essential edge 504 between node Op_1 501 of Engine_0 500 and node Op_2 522 of Engine_2 520 is redundant, and the compiler may remove the redundant essential edge 504 from the dependency graph.

Node Op_2 502 of Engine_0 500 receives an essential edge input from node Op_1 511 of Engine_1 510 and an essential edge input from node Op_2 532 of Engine_3 530. The vector clock values of preceding node Op_1 511 of Engine_1 510 and preceding node Op_2 532 of Engine_3 530 may be compared to determine whether either of the essential edge inputs to node Op_2 502 is redundant. For example, the compiler may compare the vector clock values of the nodes providing the essential edge inputs to node Op_2 502 of Engine_0 500. As shown in FIG. 5, vvc[Engine_3][Op_2]=[0, 0, 1, 2] is less than vvc[Engine_1][Op_1]=[1, 1, 1, 2] since element_0 and element_1 of the vector clock value for node Op_2 532 of Engine_3 530 are less than element_0 and element_1 of the vector clock value for node Op_1 511 for Engine_1 510. The values of element_2 and element_3 of the vector clocks are equal. Therefore, the essential edge 535 between Op_2 532 of Engine_3 530 and node Op_2 502 of Engine_0 500 is redundant, and the compiler may remove the redundant essential edge 535 from the dependency graph.

Node Op_3 503 of Engine_0 500 receives an essential edge input from node Op_2 522 of Engine_2 520 and an essential edge input from node Op_2 512 from Engine_1 510. The vector clock values of preceding nodes Op_2 522 of Engine_2 520 and Op_2 512 of Engine_1 510 may be compared to determine whether either of the essential edge inputs to node Op_3 503 of Engine_0 500 is redundant. As shown in FIG. 5, vvc[Engine_2][Op_2]=[1, 1, 2, 2] 522 is less than vvc[Engine_1][Op_2]=[1, 2, 2, 2] since element_1 of the vector clock value for node Op_2 522 of Engine_2 520 is less than element_1 of the vector clock value for node Op_2 512 of Engine_1 510. The values of element_0, element_2, and element_3 of the vector clocks are equal. Therefore, the essential edge 525 between node Op_2 522 of Engine_2 520 and node Op_3 503 of Engine_0 500 is redundant, and the compiler may remove the redundant essential edge 525 from the dependency graph.

Finally, node Op_1 511 of Engine_1 510 receives essential edge inputs from node Op_1 501 of Engine_0 500 and node Op_2 532 of Engine_3 530. The vector clock values of the preceding nodes Op_1 501 of Engine_0 500 and Op_2 532 of Engine_3 530 may be compared to determine whether either of the essential edge inputs to node Op_1 511 is redundant. For example, the compiler may compare the vector clock values of the nodes providing the essential edge inputs to node Op_1 511 of Engine_1 510. As shown in FIG. 5, neither of vvc[Engine_3][Op_2]=[0, 0, 1, 2] and vvc[Engine_0][Op_1]=[1, 0, 1, 1] is less than the other.

A comparison of the vector clock values shows that the value of element_0 for Op_2 532 of Engine_3 530 is less than the value of element_0 for OP_1 501 of Engine_0 500, the value of element_1 for Op_2 532 of Engine_3 530 is equal to the value of element_1 for OP_1 501 of Engine_0 500, the value of element_2 for Op_2 532 of Engine_3 530 is equal to the value of element_2 for OP_1 501 of Engine_0 500. However, the value of element_3 for Op_2 532 of Engine_3 530 is greater than the value of element_3 for OP_1 501 of Engine_0 500. Since the vector clocks have element values that are both greater than and less than each other, neither essential edge can be determined as redundant. Therefore, the compiler may not remove either essential edge from the dependency graph.

Figure 6:
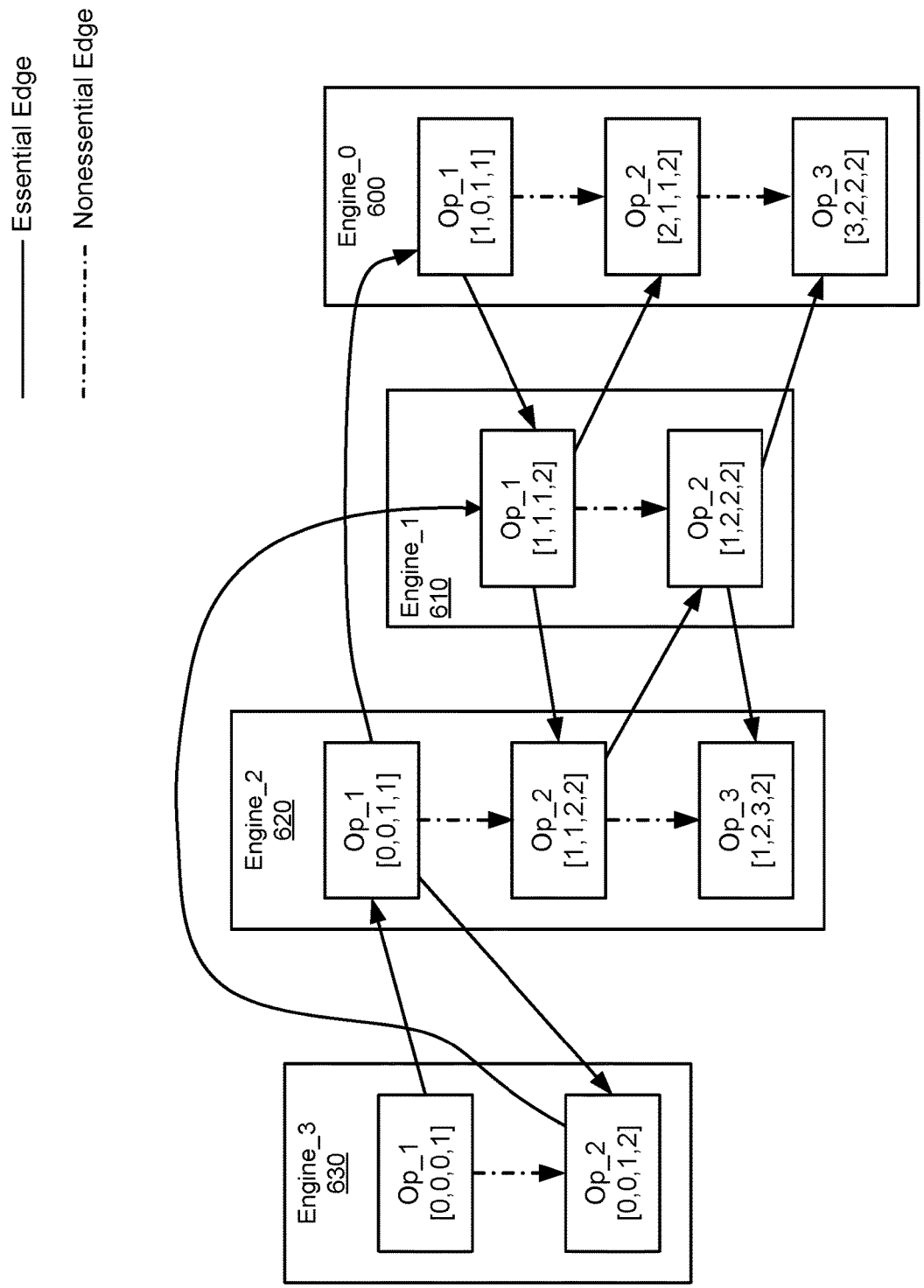
FIG. 6 is a diagram illustrating the dependency graph of FIG. 5 including vector clocks and with redundant edges removed according to some aspects of the present disclosure.

FIG. 6 is a diagram illustrating the dependency graph of FIG. 5 including vector clocks and with redundant edges removed according to some aspects of the present disclosure. FIG. 6 illustrates four execution engines—Engine_0 600, Engine_1 610, Engine_2 620, and Engine_3 630—and the associated operations (e.g., nodes) for each execution engine. As shown in FIG. 6, preceding nodes that provide essential edge inputs to a subsequent node have vector clock value less than the vector clock value of the subsequent node, thereby indicating that the operations of the preceding nodes are performed before the operations of the subsequent nodes.

Figure 7:
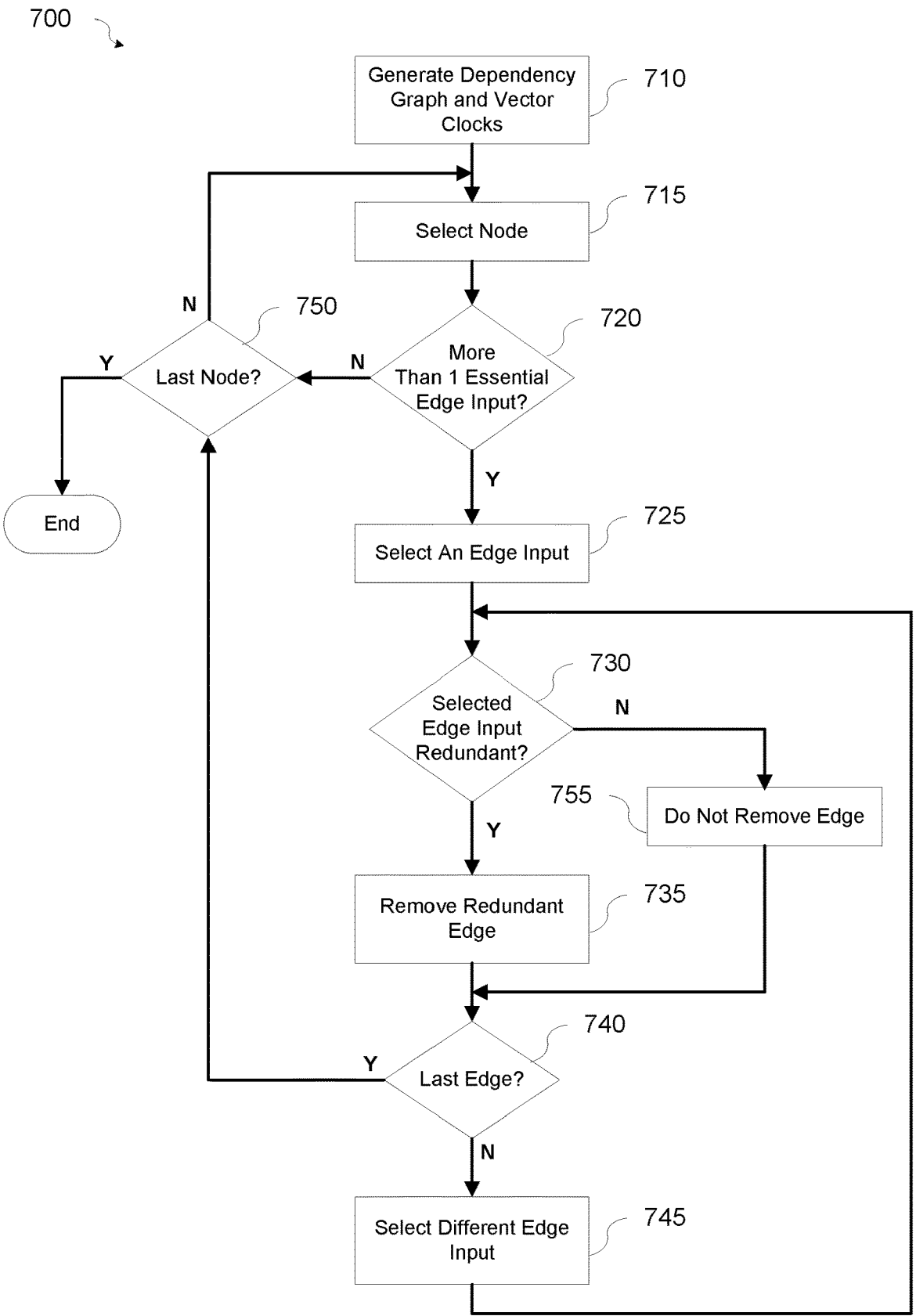
FIG. 7 is a flowchart illustrating an example of a method for using vector clocks to optimize a dependency graph according to some aspects of the present disclosure.

FIG. 7 is a flowchart illustrating an example of a method 700 for using vector clocks to optimize a dependency graph according to some aspects of the present disclosure. The method may be implemented by the systems described above, such as for example, a system described with respect to the dependency graph illustrated in FIG. 5. Referring to FIG. 7, at block 710, a dependency graph and vector clocks for each node of the dependency graph may be generated. The compiler may generate instructions for an integrated circuit device, for example a neural network accelerator, in the form of the dependency graph. The dependency graph may indicate operation or resource dependencies between execution engines of the neural network accelerator.

At block 715, a node of the dependency graph may be selected. For example, the compiler may select a node of the dependency graph to examine for essential edge inputs. Essential edges may initiate at a preceding node of one execution engine and terminate as an input to a subsequent node of a different execution engine.

At block 720, it may be determined whether the selected node has more than one essential edge input. The compiler may determine each preceding node from which an input edge to the selected subsequent node is provided. In response to determining that the selected node does not have more than one essential edge input (720-N), at block 750, the compiler may determine whether the selected node is the last node in the dependency graph to be examined. In response to determining that the selected subsequent node is not the last subsequent node in the dependency graph to be evaluated (750-N), the compiler may cause the process to continue at block 715. In response to determining that the selected node is the last node in the dependency graph to be examined (750-Y), the process may end.

In response to determining that the selected subsequent node has more than one essential edge inputs (720-Y), at block 725, one of the essential edge inputs to the selected subsequent node may be selected. The compiler may select one essential edge input to the selected subsequent node from a preceding node to compare with other essential edge inputs of other preceding nodes.

At block 730, it may be determined whether the selected essential edge input is redundant. The compiler may compare the vector clock value of the preceding node associated with the selected essential edge input with the vector clock values of other preceding nodes that provide essential edge input to the subsequent node. For example, referring to FIG. 5, subsequent node Op_2 522 of Engine_2 520 receives essential edge inputs from preceding nodes Op_1 501 of Engine_0 500, Op_1 511 of Engine_1 510, and Op_2 532 of Engine_3 530. The compiler may select one of the essential edge inputs, for example, the essential edge input from Op_1 501 of Engine_0 500, and compare the value of the vector clock for node Op_1 501 of Engine_0 500 to each of the vector clock values from the other preceding nodes to determine whether any of the essential edge input to node Op_2 522 are redundant.

The compiler may determine whether the vector clock value for the node associated with the selected essential edge input is less than the values of at least one of the vector clocks for the other preceding nodes. Using the previous notation, vvc[Engine_0][Op_1]=[1, 0, 1, 1] is less than vvc[Engine_1][Op_1]=[1, 1, 1, 2] since element_1 and element_3 of the vector clock value for node Op_1 501 of Engine_0 500 are less than element_1 and element_3 of the vector clock value for node Op_1 511 for Engine_1 510. The values of element_0 and element_2 of the vector clocks are equal. Therefore, the compiler may determine that the essential edge 504 between node Op_1 501 of Engine_0 500 and node Op_2 522 of Engine_2 520 is redundant.

In response to determining that the selected essential edge input is redundant (730-Y), at block 735, the compiler may remove the redundant edge from the dependency graph. In response to determining that the selected essential edge input is not redundant (e.g., the vector clock value for the node associated with the selected essential edge input is not less than at least one of the values of the vector clocks for the other preceding nodes) (730-N), at block 755, the compiler may not remove the selected essential edge input from the dependency graph.

At block 740, it may be determined whether the selected essential edge input for the selected node is the last essential edge input. The compiler may determine whether the vector clock values for all of the preceding nodes that provide essential edge inputs to the selected subsequent node have been evaluated to determine whether the essential edge inputs are redundant. In response to determining that the selected essential edge input is not the last essential edge input (740-N), at block 745, a different essential edge input may be selected. For example, the compiler may select an essential edge input to the subsequent node provided by a different preceding node. The compiler may then cause the process to continue at block 730.

In response to determining that the selected essential edge input is the last essential edge input (740-Y), at block 750, it may be determined whether the selected subsequent node is the last subsequent node in the dependency graph to be evaluated. The compiler may determine whether any other subsequent nodes are available for evaluation of redundant essential edge inputs. In response to determining that the selected subsequent node is the last node in the dependency graph to be evaluated (750-Y), the process may end. In response to determining that the selected subsequent node is not the last subsequent node in the dependency graph to be evaluated (750-N), the compiler may cause the process to continue at block 715.

In response to determining that the selected essential edge input is not the last essential edge input (740-N), at block 745, a different essential edge input may be selected. The compiler may select an essential edge input associated with a preceding node that has not been evaluated to determine whether the essential edge input is redundant. After selecting a different essential edge input to evaluate, the compiler may cause the process to continue at block 730.

Figure 8:
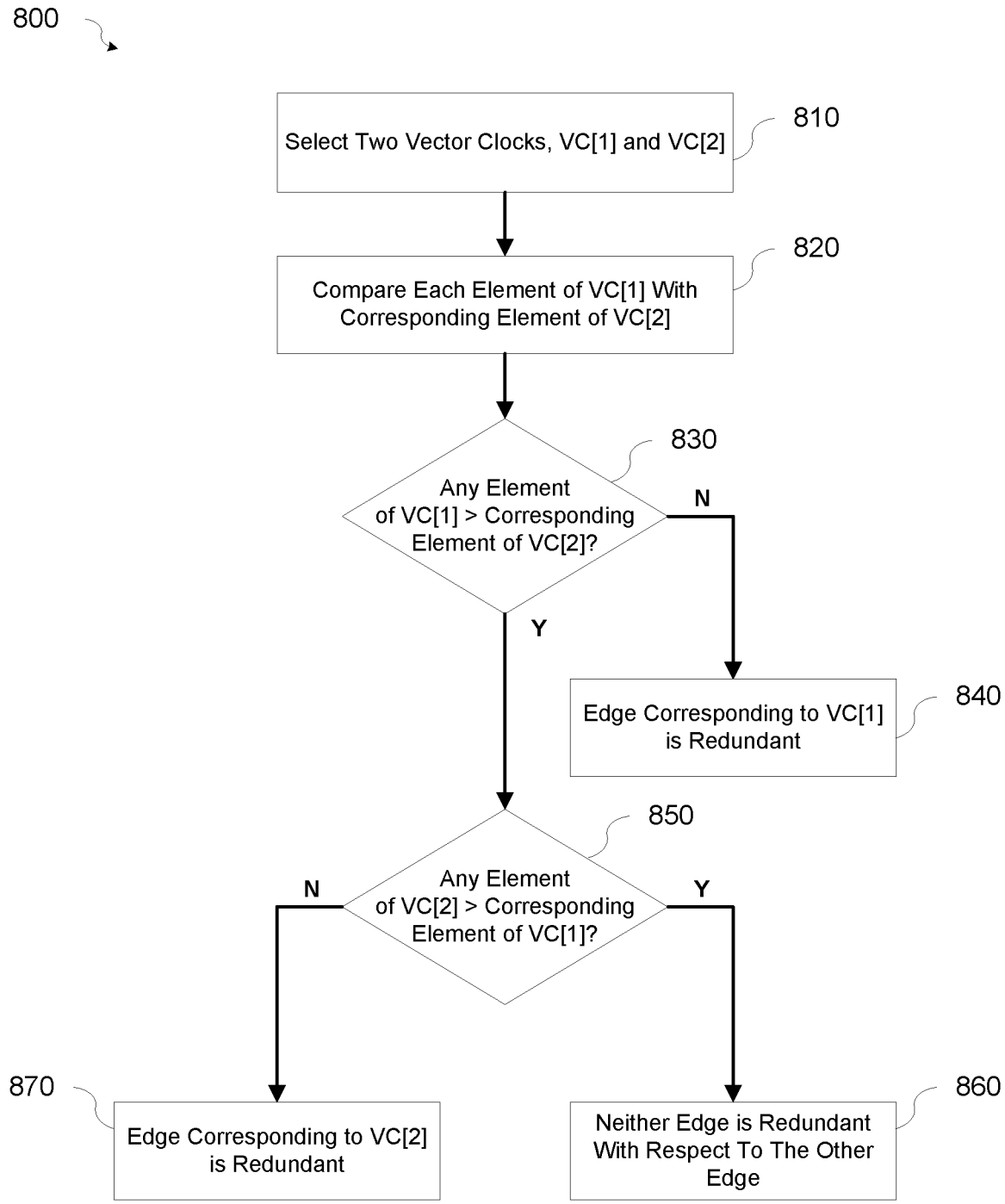
FIG. 8 is a flowchart illustrating an example of a method for comparing vector clocks according to some aspects of the present disclosure.

FIG. 8 is a flowchart illustrating an example of a method 800 for comparing vector clocks according to some aspects of the present disclosure. Referring to FIG. 8, at block 810, two vector clocks, referred to as VC [1] and VC [2], may be selected for comparison. For example, the compiler may select vector clocks from two preceding nodes, each of which provide an essential edge input to a subsequent node.

At block 820, each element of the two vector clocks may be compared. The compiler may compare each element of VC [1] with the corresponding element of VC [2]. For example, for vector clocks having N elements, element_0 of VC [1] may be compared with element_0 of VC [2], element_1 of VC [1] may be compared with element_1 of VC [2], . . . , element_N−1 of VC [1] may be compared with element_N−1 of VC [2].

At block 830 it may be determined whether any element of VC [1] is greater than the corresponding element of VC [2]. The compiler may evaluate the element comparisons to determine whether the condition is met. In response to determining that VC [1] has no element greater than a corresponding element of VC [2] (830-N), at block 840, it may be determined that the edge corresponding to VC [1] is redundant. For example, the compiler may determine that the essential edge input provided to the subsequent node by the preceding node associated with VC [1] is a redundant edge that may be removed.

In response to determining that VC [1] has at least one element greater than a corresponding element of VC [2] (830-Y), at block 850, it may be determined whether any element of VC [2] is greater than a corresponding element of VC [1]. The compiler may evaluate the element comparisons to determine whether the condition is met. In response to determining that no element of VC [2] is greater than a corresponding element of VC [1] (850-N), at block 870, it may be determined that the edge corresponding to VC [2] is redundant. For example, the compiler may determine that the essential edge input provided to the subsequent node by the preceding node associated with VC [2] is a redundant edge that may be removed.

In response to determining that at least one element of VC [2] is greater than a corresponding element of VC [1] (850-Y), at block 860, it may be determined that neither edge is redundant with respect to the other edge. For example, the compiler may determine that since VC [1] has at least one element greater than the corresponding element of VC [2], and VC [2] has at least one element greater than the corresponding element of VC [1], neither vector clock is greater or less than the other. Therefore, the compiler may determine that neither essential edge input from the nodes corresponding to VC [1] and VC [2] are redundant with respect to the other edge.

The methods 700 and 800, respectively, may be embodied on a non-transitory computer readable medium, for example, but not limited to, a memory or other non-transitory computer readable medium known to those of skill in the art, having stored therein a program including computer executable instructions for making a processor, computer, or other programmable device execute the operations of the methods.

Figure 9:
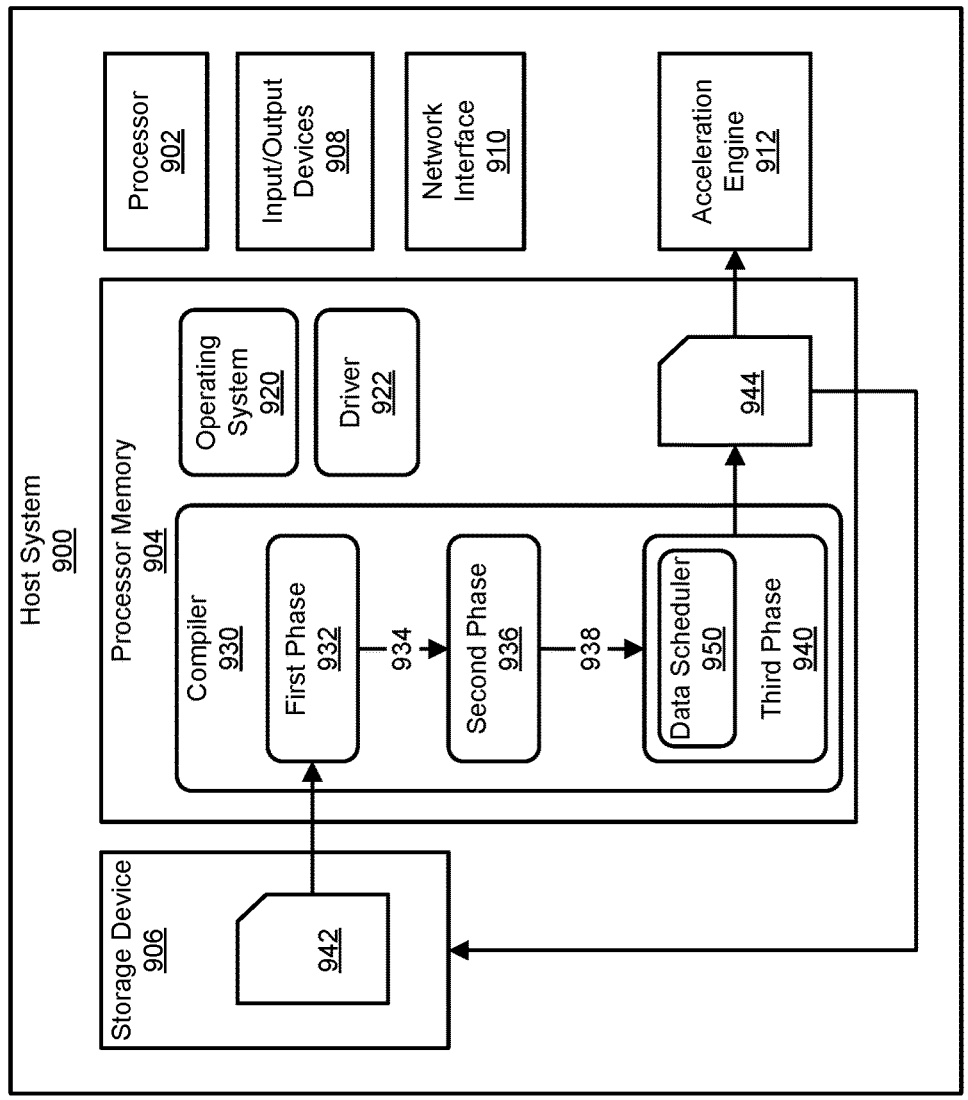
FIG. 9 includes a block diagram illustrating an example of a host system on which a compiler, such as is described herein, can run.

FIG. 9 includes a block diagram illustrating an example of a host system 900 on which a compiler 930, such as is described herein, can run. The illustrated host system 900 is an example of a computing device, and includes a processor 902, a processor memory 904, at least one storage device 906, various Input/Output (I/O) devices 908, and at least one network interface 910. In the example of FIG. 9, the host system 900 also includes an acceleration engine 912, which is an integrated circuit device that can accelerate certain operations or computations performed by the host system 900. In various examples, the host system 900 can be implemented as a server in a data center, a desktop computer, a laptop computer, a tablet computer, or a smartphone, among other examples. In some examples, operations or components discussed below as performed or included in the host system 900 can be performed or included in other computer devices. For example, the compiler 930 can execute on the host system 900 while the acceleration engine 912 is located at a different host system.

The processor 902 is an integrated circuit device that can execute program code, in the form of instructions. The program code can be for various software applications or tools, such as an operating system 920 or the illustrated compiler 930. While the processor 902 is executing a program, the instructions for the program can be stored in the processor memory 904. The instructions can also be stored elsewhere, such as on the storage device 906, and can be loaded into the processor memory 904 when needed by the processor 902. The processor 902 can also use the processor memory 904 for temporary storage of other data on which the processor 902 is operating. In various examples, the processor memory 904 is a volatile memory type, such as a type of Random Access Memory, though non-volatile memory types can, alternatively or additionally, be used for the processor memory 904.

The storage device 906 is an example of a device that can include non-volatile memory. For example, the storage device 906 can be a magnetic disk drive, a solid state drive, or an optical drive, among other examples. The storage device 906 can further be non-transitory, such that program code and other data stored on the storage device 906 remains present when the storage device 906 is not powered on.

The storage device 906 is one example of a peripheral device, which are components that can be coupled to the host system 900 to add functionality to the host system 900. Other examples of peripheral devices include the Input/Output devices 908 and the network interface 910. The Input/Output devices 908 can include user input and output devices, such as keyboards, mice, touch screens, microphones, display screens, speakers, printers, and scanners, among other examples. The network interface 910, which can be implemented using a network interface card, can provide access to one or more networks. The network interface 910 can include, for example, a physical port for connecting a network cable and/or wireless antennas for communicating with Wi-Fi and/or cellular networks. The network interface 910 can also be described as an I/O device.

The acceleration engine 912 is also another type of peripheral device or I/O device. The acceleration engine 912 is a device that is purpose built to perform certain operations that can be performed by the processor 902, but can be performed faster by the acceleration engine 912. For example, the acceleration engine 912 can be a neural network accelerator, and, as such, may be able to perform the large scale, parallel computations of a neural network more efficiently than when the computations are performed by the processor 902. As another example, the acceleration engine 912 can be a graphics processing unit (GPU), and may be optimized to perform the computations needed for graphics rendering. Other examples of devices that can be implemented by the acceleration engine 912 include cryptographic accelerators, compression and decompression accelerators, 3-D accelerators, regular expression accelerators, security accelerators, and others.

In various examples, the acceleration engine 912 can execute program code to perform certain operations. For example, when the acceleration engine 912 is a neural network accelerator, the acceleration engine 912 can be programmed to execute a particular neural network, such as one that performs image recognition or one that performs machine translation. As a further example, to support the execution of a neural network, the acceleration engine 912 can be programmed to perform operations such as copying data for the neural network from processor memory 904 (for example) into the acceleration engine 912, copying input data for the neural network from processor memory 904 into the acceleration engine 912, and/or copying results from the acceleration engine 912 into the processor memory 904, among other examples.

To generate program code for the acceleration engine 912, in various examples, the host system 900 can execute the compiler 930. Compilers, in general, are software programs that translate program code written in a human-readable language into a format (e.g., machine instructions) that can be read and processed by an integrated circuit device. In the example of FIG. 9, the acceleration engine 912 is a neural network accelerator and the compiler 930 is for compiling a neural network description into instructions to be executed by the acceleration engine 912. When the acceleration engine 912 implements a different type of accelerator, another compiler can be used.

The compiler 930 can be activated, for example, when the operating system 920 receives keyboard, mouse, touchscreen, voice commands, or other inputs from the Input/Output devices 908. The inputs can further include parameters for the compiler 930, such as the input code 942 to compile and configuration options for the compilation process. Once the compiler 930 is activated, the processor 902 can load the instructions for the compiler 930 into the processor memory 904, and can execute the instructions.

In the example of FIG. 9, the compiler 930 includes a first stage 932, a second stage 936, and a third stage 940, which each perform different operations to produce compiled code 944. In other examples, the compiler 930 can combine the operations of the first stage 932, second stage 936, and/or third stage 940 into fewer stages, or can divide the operations of one of the stages into multiple stages.

The first stage 932 can receive and process input code 942. The input code 942 can describe a program in a high-level programming language, such as Java, C++, or Tensorflow, among many other examples. The input code 942 can describe, for example, steps to perform image recognition, speech recognition, machine translation, or other operations. The input code 942 can be obtained, for example, from the storage device 906. Alternatively, though not illustrated here, the input code 942 may be located in the processor memory 904 or can be obtained from a network location, using the network interface 910. Processing of the input code 942 can include sorting the operations described in the input code 942 into layers, where the outputs of one layer provide the inputs to a next layer. Processing can also include identifying steps to be performed by the processor 902, rather than by the acceleration engine 912. For example, the processor 902, through the execution of a driver 922, may need to perform steps such as configuring Direct Memory Access (DMA) descriptors for moving data into or out of the acceleration engine 912, among other examples.

The output 934 of the first stage 932 can be organized, for example, in the layers, nodes, and connections between nodes of a neural network. The second stage 936 can perform intermediate processing on this output 934. For example, the operations performed in any one layer, or at any one node in a layer, may be too many for the acceleration engine 912 to perform at the same time. The acceleration engine 912 may, for example, have a limited amount of locale storage space for the data needed for a computation, or the computations may be more than the acceleration engine 912 can perform at one time. In this example, the first stage 932 can break the operations of the layer or node down into smaller operations, which can fit into the acceleration engine's local memory and/or can fit into the computing capacity of the acceleration engine 912. Processing of the output 934 of the first stage 932 can include other steps, such as scheduling, or determining the order in which the acceleration engine 912 and/or processor 902 will perform operations, among other examples.

In various examples, the output 938 of the second stage 936 includes the various steps to be performed by components of the acceleration engine 912, in the order that the steps are to be performed. The output 938 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 940 can operate on the output 938 of the second stage 936, and perform various steps before producing the instructions that are to be executed by the acceleration engine 912. These steps can include, for example, removing redundant dependencies, resolving or handling dependencies between nodes by inserting synchronization instructions into the code, identifying possibly optimizations in memory usage or memory bandwidth usage, and other operations. In some examples, the third stage 940 can include a data scheduler 950.

The output of the third stage 940 is compiled code 944, which may include machine instructions in binary format. In some examples, the compiled code 944 can be stored in the processor memory 904. Alternatively or additionally, the compiled code 944 can be copied to the storage device 906 or to a network location. As noted above, the acceleration engine 912 may be located at a different host system, in which case the compiled code 944 can be sent over the network interface 910 to the other host system.

In the example of FIG. 9, the host system 900 can be executing a driver 922, which can also be referred to as a device driver or runtime driver, that manages the acceleration engine 912. The driver 922 can provide an interface between applications executing on the host system 900 (or on another host system) and the acceleration engine 912. For example, the driver 922 can provide an Application Program Interface (API) that defines functions for feeding input data to the acceleration engine 912 and defining the operation to perform on the input data. In this and other examples, the driver 922 can configure the acceleration engine 912 to perform the operation. For example, the driver 922 can identify a neural network that the acceleration engine 912 is to execute, as well as the location in the processor memory 904 or on the storage device 906 where the compiled code 944 for the neural network is located. The driver 922 can further load into the acceleration engine 912 or cause the acceleration engine 912 to load the compiled code 944, can load or cause the acceleration engine 912 to load the input data on which the neural network is to operate, and/or can cause the acceleration engine 912 to begin executing on the input data. Once the acceleration engine 912 has finished, the acceleration engine 912 can notify the driver 922, and the driver 922 can deliver a result back to the application that requested the result.

Figure 10:
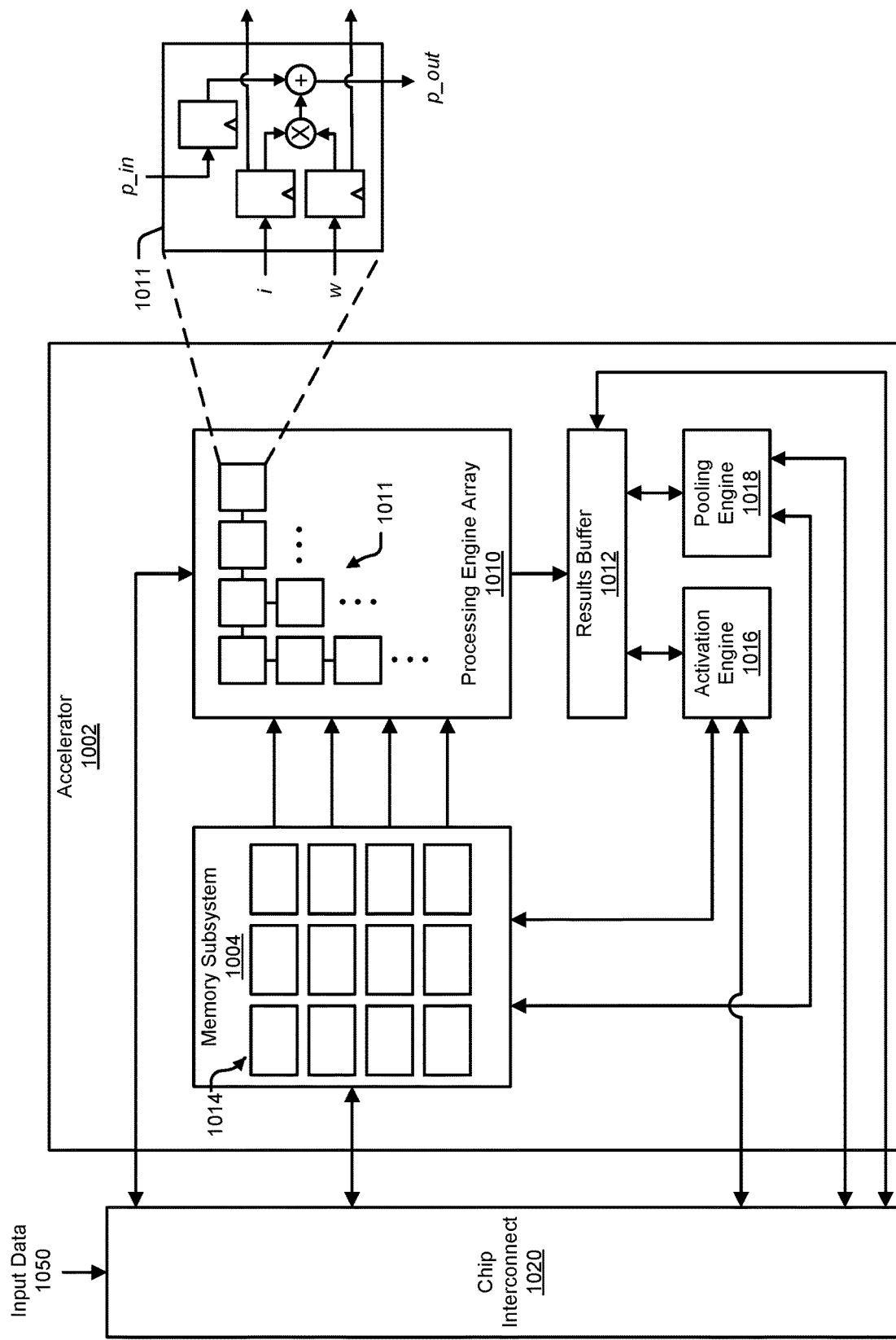
FIG. 10 is a block diagram illustrating an example of an integrated circuit device.

FIG. 10 is a block diagram illustrating an example of an integrated circuit device that can include a neural network accelerator. The example of FIG. 10 illustrates an accelerator 1002. In various examples, the accelerator 1002, for a set of input data (e.g., input data 1050), can execute computations using a processing engine array 1010, an activation engine 1016, and/or a pooling engine 1018. In some examples, the example accelerator 1002 may be an integrated circuit component of a processor, such as a neural network processor. The processor may have other integrated circuit components, including additional accelerator engines.

In various implementations, the memory subsystem 1004 can include multiple memory banks 1014. In these implementations, each memory bank 1014 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 1014. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 1004 can permit simultaneous access to the read or write channels of multiple memory banks. As another example, the memory subsystem 1004 can include arbitration logic such that arbitration between, for example, the outputs of multiple memory banks 1014 can result in more than one memory bank's output being used. In these and other examples, though globally managed by the memory subsystem 1004, each memory bank can be operated independently of any other.

Having the memory banks 1014 be independently accessible can increase the efficiency of the accelerator 1002. For example, values can be simultaneously read and provided to each row of the processing engine array 1010, so that the entire processing engine array 1010 can be in use in one clock cycle. As another example, the memory banks 1014 can be read at the same time that results computed by the processing engine array 1010 are written to the memory subsystem 1004. In contrast, a single memory may be able to service only one read or write at a time. With a single memory, multiple clock cycles can be required, for example, to read input data for each row of the processing engine array 1010 before the processing engine array 1010 can be started.

In various implementations, the memory subsystem 1004 can be configured to simultaneously service multiple clients, including the processing engine array 1010, the activation engine 1016, the pooling engine 1018, and any external clients that access the memory subsystem 1004 over a communication fabric 1020. In some implementations, being able to service multiple clients can mean that the memory subsystem 1004 has at least as many memory banks as there are clients. In some cases, each row of the processing engine array 1010 can count as a separate client. In some cases, each column of the processing engine array 1010 can output a result, such that each column can count as a separate write client. In some cases, output from the processing engine array 1010 can be written into the memory banks 1014 that can then subsequently provide input data for the processing engine array 1010. As another example, the activation engine 1016 and the pooling engine 1018 can include multiple execution channels, each of which can be separate memory clients. The memory banks 1014 can be implemented, for example, using static random access memory (SRAM).

In various implementations, the memory subsystem 1004 can include control logic. The control logic can, for example, keep track of the address spaces of each of the memory banks 1014, identify memory banks 1014 to read from or write to, and/or move data between the memory banks 1014. In some implementations, memory banks 1014 can be hardwired to particular clients. For example, a set of memory banks 1014 can be hardwired to provide values to the rows of the processing engine array 1010, with one memory bank servicing each row. As another example, a set of memory banks can be hard wired to receive values from columns of the processing engine array 1010, with one memory bank receiving data for each column.

The processing engine array 1010 is the computation matrix of the example accelerator 1002. The processing engine array 1010 can, for example, execute parallel integration, convolution, correlation, and/or matrix multiplication, among other things. The processing engine array 1010 includes multiple processing engines 1011, arranged in rows and columns, such that results output by one processing engine 1011 can be input directly into another processing engine 1011. Processing engines 1011 that are not on the outside edges of the processing engine array 1010 thus can receive data to operate on from other processing engines 1011, rather than from the memory subsystem 1004.

In various examples, the processing engine array 1010 uses systolic execution, in which data arrives at each processing engine 1011 from different directions at regular intervals. In some examples, input data can flow into the processing engine array 1010 from the left and weight values can be loaded at the top. In some examples weights and input data can flow from the left and partial sums can flow from top to bottom. In these and other examples, a multiply-and-accumulate operation moves through the processing engine array 1010 as a diagonal wave front, with data moving to the right and down across the array. Control signals can be input at the left at the same time as weights, and can flow across and down along with the computation.

In various implementations, the number of columns in the processing engine array 1010 determines the computational capacity of the processing engine array 1010, and the number of rows determines the required memory bandwidth for achieving maximum utilization of the processing engine array 1010. The processing engine array 1010 can have, for example, 64 columns and 428 rows, or some other number of columns and rows.

An example of a processing engine 1011 is illustrated in FIG. 10 in an inset diagram. As illustrated by this example, a processing engine 1011 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 1011.

In the illustrated example, an input from above can include a partial sum, p_in, provided either from another processing engine 1011 or from a previous round of computation by the processing engine array 1010. When starting a computation for a new set of input data, the top row of the processing engine array 1010 can receive a fixed value for p_in, such as zero. As illustrated by this example, i and w are multiplied together and the result is summed with p_in to produce a new partial sum, p_out, which can be input into another processing engine 1011. Various other implementations of the processing engine 1011 are possible.

Outputs from the last row in the processing engine array 1010 can be temporarily stored in the results buffer 1012. The results can be intermediate results, which can be written to the memory banks 1014 to be provided to the processing engine array 1010 for additional computation. Alternatively, the results can be final results, which, once written to the memory banks 1014 can be read from the memory subsystem 1004 over the communication fabric 1020, to be output by the system.

In some implementations, the accelerator 1002 includes an activation engine 1016. In these implementations, the activation engine 1016 can combine the results from the processing engine array 1010 into one or more output activations. For example, for a convolutional neural network, convolutions from multiple channels can be summed to produce an output activation for a single channel. In other examples, accumulating results from one or more columns in the processing engine array 1010 may be needed to produce an output activation for a single node in the neural network. In some examples, activation engine 1016 can be bypassed.

In various examples, the activation engine 1016 can include multiple separate execution channels. In these examples, the execution channels can correspond to the columns of the processing engine array 1010, and can perform an operation on the outputs of a column, the result of which can be stored in the memory subsystem 1004. In these examples, the activation engine 1016 may be able to perform between 1 and n parallel computations, where n is equal to the number of columns in the processing engine array 1010. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 1002 can include a pooling engine 1018. Pooling is the combining of outputs of the columns of the processing engine array 1010. Combining can include for example, computing a maximum value, a minimum value, an average value, a median value, a summation, a multiplication, or another logical or mathematical combination. In various examples, the pooling engine 1018 can include multiple execution channels that can operating on values from corresponding columns of the processing engine array 1010. In these examples, the pooling engine 1018 may be able to perform between 1 and n parallel computations, where n is equal to the number of columns in the processing engine array 1010. In various examples, execution channels of the pooling engine 1018 can operate in parallel and/or simultaneously. In some examples, the pooling engine 1018 can be bypassed.

Herein, the activation engine 1016 and the pooling engine 1018 may be referred to collectively as execution engines. The processing engine array 1010 is another example of an execution engine. Another example of an execution engine is a Direct Memory Access (DMA) engine, which may be located outside the accelerator 1002.

Input data 1050 can arrive over the communication fabric 1020. The communication fabric 1020 can connect the accelerator 1002 to other components of a processor, such as a DMA engine that can obtain input data 1050 from an Input/Output (I/O) device, a storage drive, or a network interface. The input data 1050 can be, for example one-dimensional data, such as a character string or numerical sequence, or two-dimensional data, such as an array of pixel values for an image or frequency and amplitude values over time for an audio signal. In some examples, the input data 1050 can be three-dimensional, as may be the case with, for example, the situational information used by a self-driving car or virtual reality data. In some implementations, the memory subsystem 1004 can include a separate buffer for the input data 1050. In some implementations, the input data 1050 can be stored in the memory banks 1014 when the accelerator 1002 receives the input data 1050.

In some examples, the accelerator 1002 can implement a neural network processing engine. In these examples, the accelerator 1002, for a set of input data 1050, can execute a neural network to perform a task for which the neural network was trained. Executing a neural network on a set of input data can be referred to as inference or performing inference.

The weights for the neural network can be stored in the memory subsystem 1004, along with input data 1050 on which the neural network will operate. The neural network can also include instructions, which can program the processing engine array 1010 to perform various computations on the weights and the input data. The instructions can also be stored in the memory subsystem 1004, in the memory banks 1014 or in a separate instruction buffer. The processing engine array 1010 can output intermediate results, which represent the outputs of individual layers of the neural network. In some cases, the activation engine 1016 and/or pooling engine 1018 may be enabled for computations called for by certain layers of the neural network. The accelerator 1002 can store the intermediate results in the memory subsystem 1004 for inputting into the processing engine array 1010 to compute results for the next layer of the neural network. The processing engine array 1010 can further output final results from a last layer of the neural network. The final results can be stored in the memory subsystem 1004 and then be copied out to host processor memory or to another location.

Figure 11:
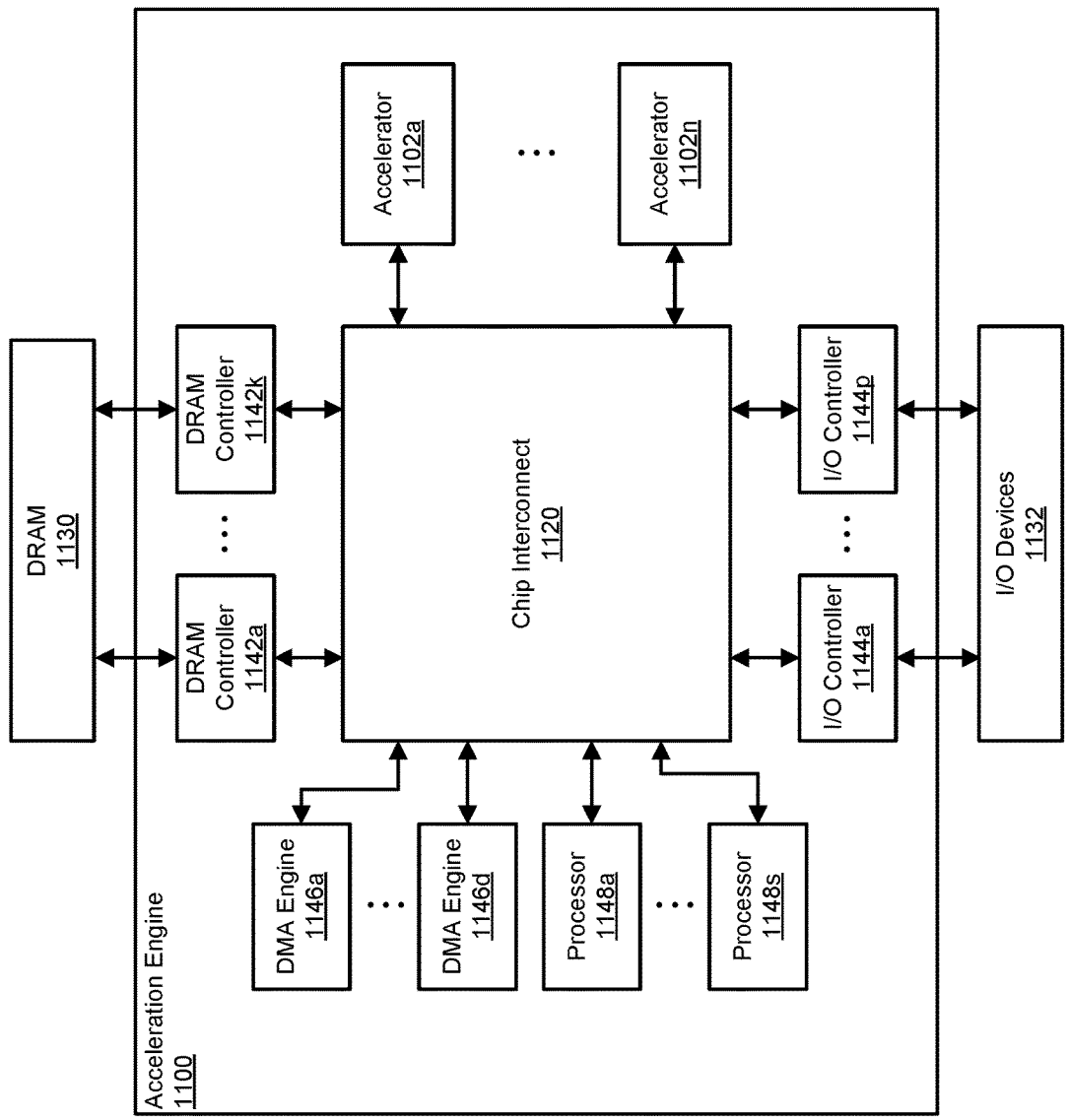
FIG. 11 includes a block diagram that illustrates an example of an acceleration engine.

FIG. 11 includes a block diagram that illustrates an example of an acceleration engine 1100. The acceleration engine 1100 is an example of an integrated circuit that can include one or more accelerators 1102a-1102n that may be similar to the accelerator illustrated in FIG. 10.

In the example of FIG. 11, the acceleration engine 1100 includes multiple accelerators 1102a-1102n, each of which can perform a set of operations. In various examples, the accelerators 1102a-1102n are for particular types of operations, so that the accelerators 1102a-1102n can perform the operations much faster than when similar operations are performed by a general purpose processor. In various examples, to perform a set of operations, input data on which the operations are to be performed must first be moved into the accelerators 1102a-1102n. Additionally, in some cases, program code is also moved into the accelerators 1102a-1102n, which programs the operations that the accelerators 1102a-1102n will perform on the data. In the illustrated example, the acceleration engine 1100 includes n accelerators 1102a-1102n. Examples of accelerators that can be included in the acceleration engine 1100 include graphics accelerators, floating point accelerators, neural network accelerators, and others. In various examples, the accelerators 1102a-1102n can each be the same (e.g., each of the is a graphics accelerator) or can be different (e.g., the accelerators 1102a-1102n include a graphics accelerator, a floating point accelerator, and neural network accelerator).

The example acceleration engine 1100 further includes DRAM controllers 1142a-1142k for communicating with an external memory. The external memory is implemented, in this example, using DRAM 1130. In the illustrated example, the acceleration engine 1100 includes k DRAM controllers 1142a-1142k, each of which may be able to communicate with an independent set of banks of DRAM. In other examples, other types of RAM technology can be used for the external memory. The DRAM controllers 1142a-1142k can also be referred to as memory controllers.

In various examples, input data and/or program code for the accelerators 1102a-1102n can be stored in the DRAM 1130. Different programs can cause the accelerators 1102a-1102n to perform different operations. For example, when one of the accelerators is a neural network accelerator, one program can configure the neural network accelerator to perform speech recognition while another program can configure the neural network accelerator to perform image recognition. In various examples, different accelerators 1102a-1102n can be programmed with different programs, so that each performs a different set of operations. In various examples, the processors 1148a-1148s can manage moving of program code from the DRAM 1130 to the accelerators 1102a-1102n.

The example acceleration engine 1100 further includes I/O controllers 1144a-1144p for communicating with I/O devices 1132 in the system. The acceleration engine 1100 can communicate with I/O devices over, for example, a processor bus. In some examples, the processor bus can be implemented using Peripheral Component Interconnect (PCI) and/or a variation of the PCI bus protocol. The processor bus can connect the acceleration engine 1100 to I/O devices such as, for example, input and output devices, memory controllers, storage devices, and/or network interface cards, among other things. In some examples, the I/O controllers 1144-1144p can enable the acceleration engine 1100 to act as an I/O device for a host processor. For example, the acceleration engine 1100 can be the recipient of input data from the host processor, and a command indicating an operation to be performed on the input data (e.g., a particular computation or analysis). In the illustrated example, the acceleration engine 1100 includes p I/O controllers 1144a-1144p, each of which may include a separate root complex and may communicate with a separate set of I/O devices 1132. In other examples, other standardized bus protocols, such as Ultra Path Interconnect (UPI) can be used for the host bus. In other examples, a proprietary bus protocol can be used.

Movement of data in the acceleration engine 1100 can be managed by one or more processors 1148a-1148s, which can also be referred to as data management processors. In the example of FIG. 11, the acceleration engine 1100 includes s processors 1148a-1148s incorporated into the device (e.g., on the same silicon die). In other examples, the processors 1148a-1148s can be external to the acceleration engine 1100 (e.g., on a different die and/or in a different package). In some examples, the processors 1148a-1148s can manage the movement of data from I/O devices 1132 to the accelerators 1102a-1102n or the DRAM 1130. For example, input data may be located at an I/O device 1132 or in processor memory, and the processors 1148a-1148s can move the input from the I/O device 1132 or processor memory into an accelerator or into DRAM 1130. As another example, program code for the accelerators 1102a-1102n may be located on an I/O device 1132 or in processor memory.

The example acceleration engine 1100 further includes DMA engines 1146a-1146d that can move data between the accelerators 1102a-1102n, DRAM controllers 1142a-1142k, and I/O controllers 1144a-1144p. In the illustrated example, the acceleration engine 1100 includes d DMA engines 1146*a*-1146*d*. In some implementations, the DMA engines 1146*a*-1146*d* can be assigned to specific tasks, such as moving data from the DRAM controllers 1142*a*-1142*d* to the accelerators 1102*a*-1102*n*, or moving data between the I/O controllers 1144*a*-1144*p* and the accelerators 1102*a*-1102*n*. These tasks can be assigned, for example, by enqueuing descriptors with the DMA engines 1146*a*-1146*d*, where a descriptor identifies an address for a block of data and an operation (e.g., a read or a write) to perform. A descriptor, for example, can direct a DMA engine to instruct a DMA controller to read a block of data from DRAM 1130. A descriptor can, as a further example, instruct the DMA engine to write data, read by the DMA controller, to an accelerator. Further descriptors can be used to move data from an accelerator to DRAM 1130.

In various examples, each of the processors 1148*a*-1148*s* can be responsible for managing the data movement for a different accelerator. In some examples, a processor may manage the data movement for more than one accelerator. Similarly, in various examples, each of the processors 1148*a*-1148*s* can be assigned to one or more DMA engines 1146*a*-1146*d*. In these and other examples, associations between processors 1148*a*-1148*s*, accelerators 1102*a*-1102*n*, and DMA engines 1146*a*-1146*d* are determined by program code being executed by each respective processor.

In the example acceleration engine 1100, the various components can communicate over a chip interconnect 1120. The chip interconnect 1120 primarily includes wiring for routing data between the components of the acceleration engine 1100. In some cases, the chip interconnect 1120 can include a minimal amount of logic, such as multiplexors to control the direction of data, flip-flops for handling clock domain crossings, and timing logic.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method for implementing a simplified dependency graph for a neural network accelerator, the method comprising:
compiling program code by a compiler to generate the dependency graph, the dependency graph having a set of nodes corresponding to operations to be performed by each execution engine of a set of execution engines in the neural network accelerator;
generating, by the compiler, a set of vector clocks, each vector clock of the set of vector clocks corresponding to one node of the set of nodes in the dependency graph and including an element that corresponds to each execution engine of the set of execution engines;
incrementing a corresponding element of the vector clock for each node at an endpoint of an operation performed at the node by the execution engine;
selecting a node of a first execution engine of the set of execution engines from the set of nodes in the dependency graph, the selected node having a first input edge from a node of a second execution engine and a second input edge from a node of a third execution engine;
comparing a vector clock value of the node of the second execution engine with a vector clock value of the node of the third execution engine;
determining that the vector clock value of the node of the second execution engine is not less than the vector clock value of the node of the third execution engine;
implementing the first input edge between the node of the second execution engine and the selected node with a synchronization instruction;
comparing a vector clock value of a node of a fourth execution engine that provides a third input edge to the selected node with the vector clock value of the node from the third execution engine;

determining that the vector clock value of the node of the third execution engine is less than the vector clock value of the node of the fourth execution engine; and removing the second input edge between the node of the third execution engine and the selected node from the dependency graph.

2. The computer-implemented method of claim 1, wherein comparing the vector clock value comprises comparing a value of each element of one vector clock with a value of a corresponding element of another vector clock.

3. The computer-implemented method of claim 1, wherein the vector clock value of a first node is less than the vector clock value of a second node when at least one element of the vector clock of the first node has a value less than the value of a corresponding element of the vector clock of the second node, and no element of the vector clock of the first node has a value greater than the value of the corresponding element of the vector clock of the second node.

4. A method, comprising:

compiling program code by a compiler to obtain a description of a set of nodes representing operations to be performed by a set of execution engines of an integrated circuit device, wherein the set of nodes are connected through a plurality of edges corresponding to dependencies between the set of nodes;

generating, by the compiler, a set of vector clocks associated with the set of nodes, the set of vector clocks configured to be incremented at an endpoint of an operation performed by a corresponding execution engine of the set of execution engines at each node in the set of nodes, each vector clock of the set of vector clocks including an element that corresponds to each execution engine of the set of execution engines;

identifying a set of edges, each edge of the set of edges initiating from a corresponding preceding node and terminating on a same subsequent node, each preceding node being executable on a different execution engine of the set of execution engines than the subsequent node;

comparing vector clock values of each preceding node;

determining at least one vector clock value corresponding to a preceding node that is not less than at least one other vector clock value corresponding to at least one other preceding node;

implementing an edge corresponding to each preceding node having a vector clock value not lower than a highest vector clock value of a preceding node with a synchronization instruction; and removing an edge corresponding to each preceding node having a vector clock value lower than the highest vector clock value of a preceding node.

5. The method of claim 4, wherein each vector clock of the set of vector clocks has a same number of elements as a number of execution engines in the set of execution engines, and each element of a vector clock represents operations executed by a corresponding execution engine.

6. The method of claim 5, wherein comparing vector clock values comprises:

selecting a first preceding node and a second preceding node; and comparing values of each element of a first vector clock associated with the first preceding node with values of corresponding elements of a second vector clock associated with the second preceding node.

7. The method of claim 5, wherein a value of an element of each vector clock is incremented at an endpoint of an operation to be performed by the node associated with the vector clock.

8. The method of claim 4, wherein the description of the set of nodes is a description of a neural network.

9. The method of claim 4, wherein elements of a vector clock for a subsequent node replicate maximum values of corresponding vector clock elements of preceding nodes.

10. The method of claim 4, wherein the vector clock value of a first node is less than the vector clock value of a second node when at least one element of the vector clock of the first node has a value less than the value of a corresponding element of the vector clock of the second node, and no element of the vector clock of the first node has a value greater than the value of the corresponding element of the vector clock of the second node.

11. The method of claim 4, wherein values of vector clock elements are integer values.

12. The method of claim 4, wherein the set of execution engines includes an array of processing engines, a computation engine executing a pooling operation, a computation engine executing an activation function, or a Direct Memory Access (DMA) engine.

13. A non-transitory computer-readable medium having stored therein instructions that, when executed by one or more processors, cause the one or more processors to execute a compiler, the compiler performing operations including:

compiling program code by a compiler to obtain a description of a set of nodes representing operations to be performed by a set of execution engines of an integrated circuit device, wherein the set of nodes are connected through a plurality of edges corresponding to dependencies between the set of nodes;

generating, by the compiler, a set of vector clocks associated with the set of nodes, the set of vector clocks configured to be incremented at an endpoint of an operation to be performed by a corresponding execution engine of the set of execution engines at each node in the set of nodes each vector clock of the set of vector clocks including an element that corresponds to each, execution engine of the set of execution engines;

identifying a set of edges, each edge of the set of edges initiating from a corresponding preceding node and terminating on a same subsequent node, each preceding node being executable on a different execution engine of the set of execution engines than the subsequent node;

comparing vector clock values of each preceding node;

determining at least one vector clock value corresponding to a preceding node that is less than at least one other vector clock value corresponding to at least one other preceding node;

implementing an edge corresponding to each preceding node having a vector clock value not lower than a highest vector clock value of a preceding node with a synchronization instruction; and removing an edge corresponding to each preceding node having a vector clock value lower than the highest vector clock value of a preceding node.

14. The non-transitory computer-readable medium of claim 13, wherein elements of a vector clock for a subsequent node replicate maximum values of corresponding vector clock elements of preceding nodes.

15. The non-transitory computer-readable medium of claim 13, wherein comparing vector clock values comprises:

selecting a first preceding node and a second preceding node; and comparing values of each element of a first vector clock associated with the first preceding node with values of corresponding elements of a second vector clock associated with the second preceding node.

16. The non-transitory computer-readable medium of claim 13, wherein:

each vector clock of the set of vector clocks has a same number of elements as a number of execution engines in the set of execution engines; and each element of a vector clock represents operations executed by a corresponding execution engine.

17. The non-transitory computer-readable medium of claim 16, wherein comparing vector clock values comprises:

selecting a first preceding node and a second preceding node; and comparing values of each element of a first vector clock associated with the first preceding node with values of corresponding elements of second vector clock associated with the second preceding node.

18. The non-transitory computer-readable medium of claim 13, wherein:

the vector clock value of a first node is less than the vector clock value of a second node when at least one element of the vector clock of the first node has a value less than the value of a corresponding element of the vector clock of the second node; and no element of the vector clock of the first node has a value greater than the value of the corresponding element of the vector clock of the second node.

19. The non-transitory computer-readable medium of claim 13, wherein the set of execution engines includes an array of processing engines, a computation engine executing a pooling operation, a computation engine executing an activation function, or a Direct Memory Access (DMA) engine.

20. The method of claim 1, wherein each vector clock of the set of vector clocks has a same number of elements as a number of execution engines in the set of execution engines, and each element of a vector clock represents operations executed by a corresponding execution engine.

* * * * *